2 Sheets--Sheet 1.

R. COOKE & T. HANFORD.

Mechanisms for Shearing Caps.

No. 5,642. Reissued Nov. 4, 1873.

Witnesses.

Wm C. Gey

Alf. Westbrook

Inventors.

Richard Cooke and

Thomas Hanford by their attys F. L. Stetson

AM. PHOTO-LITHOGRAPHIC Co. N.Y. (OSBORNE'S PROCESS)

2 Sheets--Sheet 2.

R. COOKE & T. HANFORD.

Mechanisms for Shearing Caps.

No. 5,642. Reissued Nov. 4, 1873.

Witnesses

Wm C Gey.

Alf. Westbrook

Inventors

Richard Cooke and

Thomas Hanford by their attys

F. L. Sutton

AM. PHOTO-LITHOGRAPHIC CO. N.Y. (OSBORNE'S PROCESS)

UNITED STATES PATENT OFFICE.

RICHARD COOKE, OF NEW HARTFORD, NEW YORK, AND THOMAS HANFORD, OF NORWICH, CONNECTICUT.

IMPROVEMENT IN MECHANISMS FOR SHEARING CAPS.

Specification forming part of Letters Patent No. 119,449, dated October 3, 1871; reissue No. 5,642, dated November 4, 1873; application filed April 19, 1873.

DIVISION A.

*To all whom it may concern:*

Be it known that we, RICHARD COOKE, of New Hartford, in the county of Oneida and State of New York, and THOS. HANFORD, of Norwich, Connecticut, formerly of New Hartford, aforesaid, have invented a certain Device which we denominate a Cap-Shearing Block, to be used in shearing woolen caps, of which the following is a specification:

The knitted cap is a foreign manufacture, and, as far as known, is sheared entirely by hand.

The object of our invention is to furnish a convenient device for presenting the circular surface of the cap, both the body and the crown, to the blades of the common cloth manufacturer's shears, driven by power, and revolving the cap in contact with the shears in motion to shear the cap, both the body and the crown, in a neat, uniform, and expeditious manner.

The following is a description of what we consider the best means of carrying out the invention.

Figure 1:
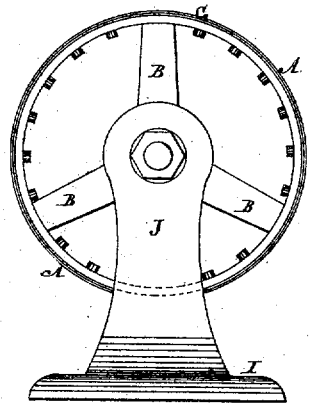
Figure 2:
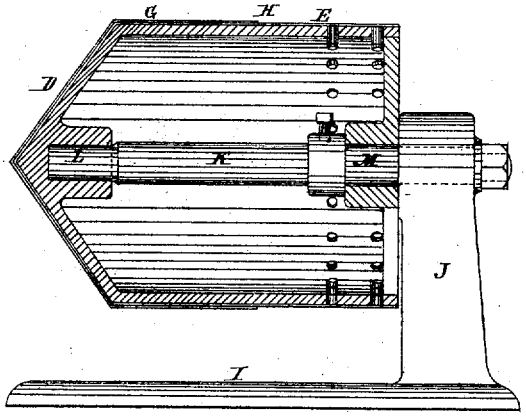
Figure 3:
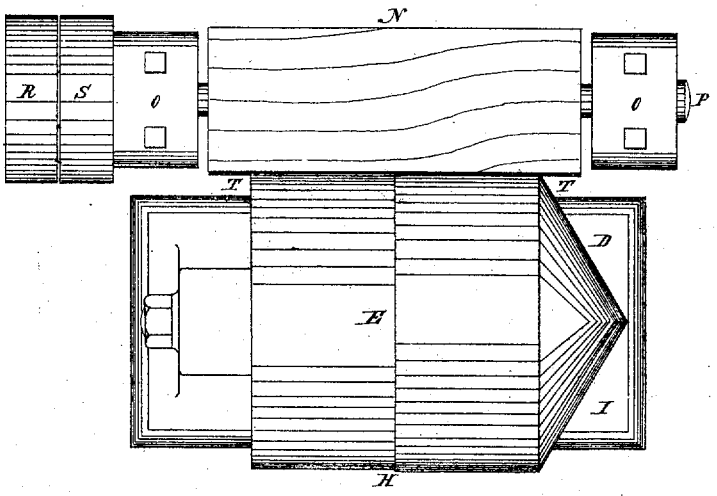
Figure 4:
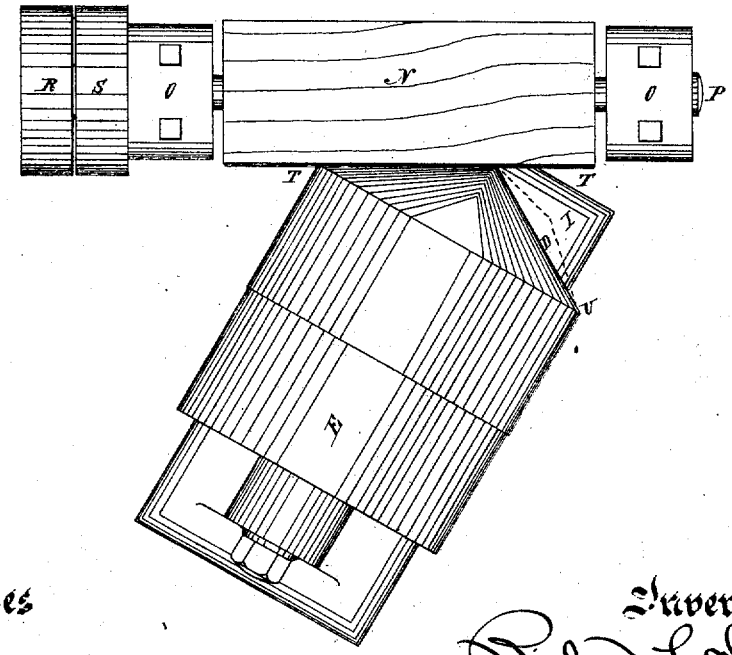

In the annexed drawing, A, Figure 1, is an end view of our shearing-block, including its hangings and base or pedestal. It is hollow, as shown, and supported by the interior radiating arms B; or it may be made solid, and of wood or metal. The drawing exhibits the cap drawn on over the block, as shown by the double line G, Fig. 1, on the surface. The opposite end of the block, in order to correspond with the crown of the cap, is conical in form, as shown at D, Fig. 2. This latter figure exhibits a vertical section of the block. E is the cylindrical part of the block, and D the conical portion or crown. G is the cap, drawn over the block from the conical end and extending back to H, as seen. I is the platform or base; J, the supporting-standard; K, the axle, with a bearing at L, and another at M. The block is made to revolve easily on its axis. Its movement is slow, being gently revolved by hand. Its position, in reference to the shears, is shown in Figs. 3 and 4. N is the common spiral cloth-shearer, which is rotated by power. O are its bearing-boxes; P, its shaft; and R S, a tight and loose pulley, for the application of the driving-belt. The leger-blade, being the stationary edge on which the circular shears cut, is seen projecting at the right and left at T T. The iron pedestal I, and the frame sustaining the block, more clearly shown in Fig. 2, are made heavy with a view to the steadiness of the block when in use.

The shears being in rapid motion, the block is moved up to them by hand to a suitable position for shearing the cap, and is then rotated slowly by hand, as the shears are doing their work, until the body of the cap is completely sheared; the block is then withdrawn and turned to the position shown in Fig. 4 for the purpose of shearing the conical surface D of the crown of the cap. The block being in position for this purpose, is again rotated as before until the crown is sheared.

In order to soften the angle at U, giving the crown of the cap a more rounded appearance, the crown of the block may be made of two or more planes; in which case each of the planes is presented to the shears and shorn separately.

The block may also be made double or conical at each end for the reception of two caps at a time. In that case there is, as in the ordinary turning-lathe, an adjustable supporting-standard at one end, with a sharp point presented to and slightly penetrating the apex of the cone sufficiently to support the block; and the fixed standard at the opposite end has a like point to penetrate in like manner the point of the opposite cone. When the block is thus suspended the adjustable standard is secured in the manner of the turning-lathe, and the block is manipulated for the shearing of each cap, as before described.

Having thus described our invention, we claim as new, and desire to secure by Letters Patent—

The shearer N and leger-knife T, in combination with the movable cap-supporting block E, as and for the purposes described.

In testimony whereof we have hereunto set our hands this 5th day of April, 1873, in the presence of two subscribing witnesses.

RICHARD COOKE.
THOMAS HANFORD.

Witnesses for RICHARD COOKE:
F. J. COOKE,
L. B. ROOT.

Witnesses for T. HANFORD:
JNO. T. WAIT,
T. WALTER SWAN.